United States Patent [19]

Hopes

[11] Patent Number: 4,625,838
[45] Date of Patent: Dec. 2, 1986

[54] VEHICLE ANTI-SKID/WHEELSPIN DEVICE

[75] Inventor: George D. Hopes, Reading, England

[73] Assignee: The Secretary of State for Transportation in Her Britannic Majesty's Government of the United Kingdom of Great Britain and Northern Ireland, London, England

[21] Appl. No.: 718,016
[22] PCT Filed: Aug. 3, 1984
[86] PCT No.: PCT/GB84/00270
§ 371 Date: Mar. 29, 1985
§ 102(e) Date: Mar. 29, 1985
[87] PCT Pub. No.: WO85/00789
PCT Pub. Date: Feb. 28, 1985

[30] Foreign Application Priority Data

Aug. 4, 1983 [GB] United Kingdom ............... 8321040

[51] Int. Cl.⁴ .............................................. B60T 8/093
[52] U.S. Cl. ................................................. 188/181 A
[58] Field of Search ............. 188/2 A, 180 R, 181 A, 188/181 T; 303/112

[56] References Cited

U.S. PATENT DOCUMENTS 1,636,706 7/1927 Reisfeld.
1,640,919 8/1927 Ballot ...................... 188/181 A X

FOREIGN PATENT DOCUMENTS 952262 3/1964 United Kingdom.
1156015 6/1969 United Kingdom.
1169463 11/1969 United Kingdom.

Primary Examiner—Duane A. Reger
Attorney, Agent, or Firm—Cushman, Darby & Cushman

[57] ABSTRACT

A vehicle anti-skid/wheelspin device, comprising a force applicator which may be either a brake (17) or a driven shaft, a hub (3) to which the vehicle wheel may be attached, a wrap spring clutch (23) to connect the force applicator to the hub and an inertia responsive device such as a flywheel (35) to disconnect the force applicator from the hub by causing the wrap spring clutch to unwrap when the acceleration or deceleration of the hub relative to the flywheel exceeds a predetermined value.

4 Claims, 2 Drawing Figures

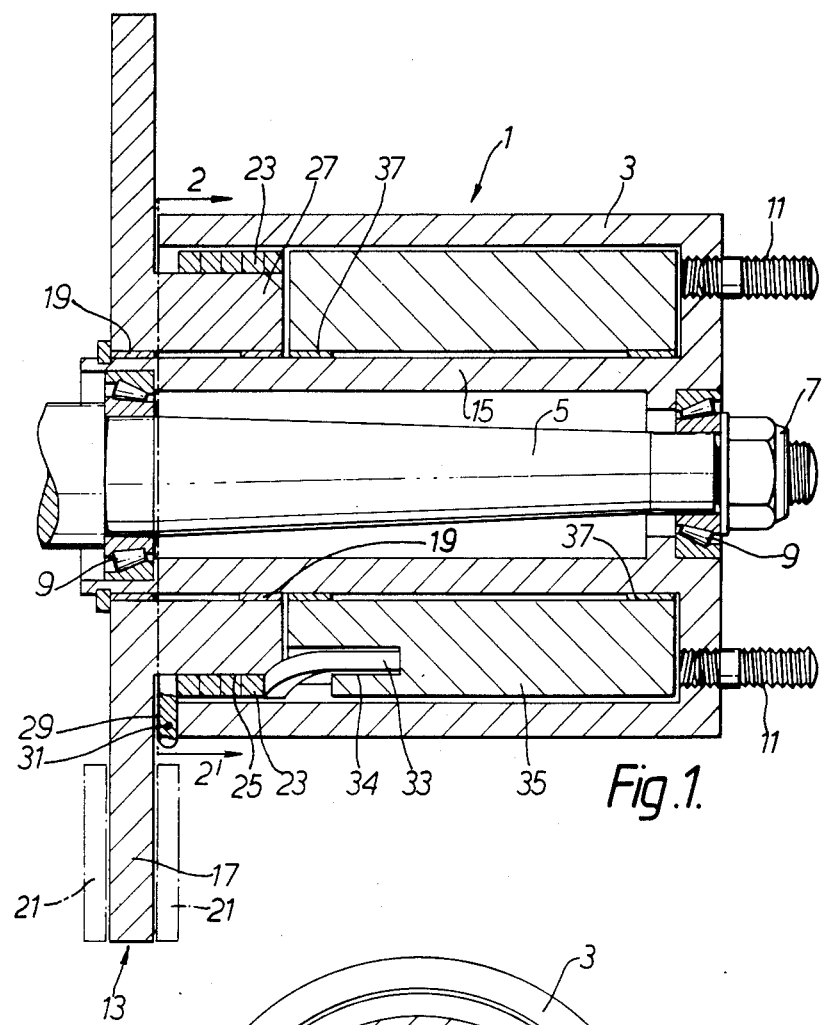
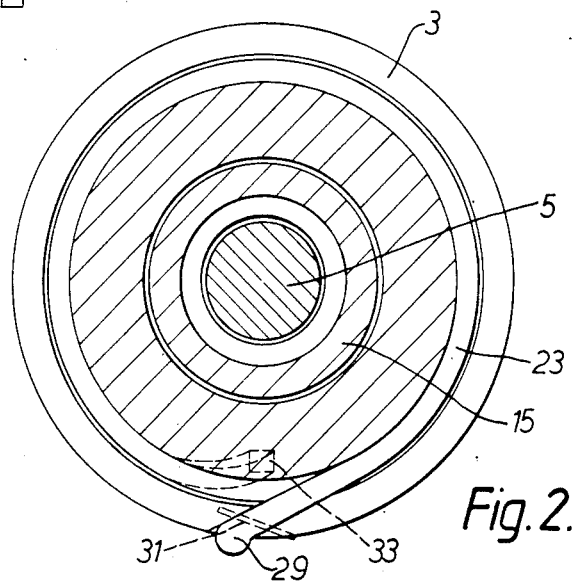

VEHICLE ANTI-SKID/WHEELSPIN DEVICE

BACKGROUND OF THE INVENTION

1. Field of the Invention

This invention relates to a device for preventing skidding or spinning of a wheel relative to a wheel contacting surface.

2. Description of the Prior Art

A major problem encountered with road or rail vehicles is that of spinning or skidding, ie slip of tires relative to the road or track surface.

In the case of a road vehicle, this condition most commonly hppens when the road surface is wet or covered by ice. In such a case, either the wheels spin relative to the road when the wheels are being driven, or, alternatively, when a braking force is applied to the wheel, the brake and tire lock up relative to the road and the vehicle skids. Skidding and spinning are both undesirable and dangerous and proposals have been made to alleviate the problems they create.

In particular, a system, to prevent skidding during braking of a motor vehicle, has been proposed which employs an inertia responsive device or flywheel which responds to a declaration in excess of a pre-determined value. Movement of the inertia responsive device or flywheel controls the pressure of braking fluid, in a braking system, thus controlling the degree of braking, and preventing the wheel from locking up relative to the road surface, and skidding.

A disadvantage of the above mentioned system is that an associated fluid control system including a pump is required to restore the braking fluid pressure once the skidding has ceased. This makes the arrangement expensive and complicated.

SUMMARY OF THE INVENTION

According to the present invention, there is provided a vehicle anti-skid/wheelspin device, which comprises a hub, a force application means, an engagement means to engage said hub with said force application means, an inertia responsive means cooperating with said engagement means to disengage said hub from said force application means at a predetermined rate of change of velocity of said hub relative to said inertia responsive means, characterised in that said engagement means is a clutch of wrap spring construction.

According to the invention also, a declutching system is provided which is adaptable to be responsive to at least one of acceleration and deceleration, so s to declutch a first member from a second member, when said acceleration or deceleration of said first and second members exceeds a predetermined level.

BRIEF DESCRIPTIONS OF THE DRAWINGS

Embodiments of the invention will now be described, by way of example, with reference to the accompanying drawings in which:

FIG. 1 is a sectional view of an embodiment of the invention.

FIG. 2 is a part sectional view taken along the line 2.2' of FIG. 1.

DETAILED DESCRIPTION OF THE PREFERRED EMBODIMENT

With reference to FIGS. 1 and 2, a wheel hub and disc brake assembly 1, of generally cylindrical form, is shown. The assembly 1 includes a wheel hub 3 positioned relative to a shaft 5 by means of a nut 7, the hub 3 being freely rotatable on the shaft 5 by means of taper roller bearings 9. The hub 3 includes studs 11 for engagement with, for example, a conventional car wheel and tire (not shown).

A disc brake assembly 13 is mounted relative to the inner cylindrical portion 15 of the hub 3. The disc brake assembly 13 includes a disc 17 which is mounted by means of bearing material 19 relative to the portion 15. A pair of conventional disc brake pads 21 are shown in phantom lines, these being connected to a disc brake caliper (not shown) for applying a brake force to the disc. A wrap spring 23 is coiled around the outer surface 25 of an axially extending portion 27 of the disc 17. The wrap spring 23 is press fitted on to the portion 27.

The spring 23 is formed from high tensile steel, for example EN50, and is of square cross section. The spring is secured at one end 29 thereof in a slot in the hub 3. The end 29 of the spring 23 is slightly enlarged so as to prevent the spring 23 retracting into the hub. A pin 31 is driven into the hub 3, across the end 29, to prevent axial displacement of the spring 23 towards the disc 17.

The end 29 is held tangential to the main body of the spring, to reduce any bending forces which may be generated during use and thereby avoid fatigue.

The opposite end 33 of the spring 23 is positioned within an axially directed slot 34 in a flywheel 35. The flywheel 35 is mounted relative to the portion 15 of the hub 3 by means of bearing material 37.

In operation, the above assembly 1 would be fitted to a motor vehicle, for example a car, preferably attached to a front wheel thereof, as it is usual for 60% of the braking effort of a motor vehicle to come from the front wheels.

When it is desired to apply the brakes, depression of the braking pedal in a car will result in the disc brake caliper forcing the pads 21 against the disc 17. In normal operation, the braking force will be transferred from the disc 17 to the hub 3 and thence to the wheel and tire by means of the spring 23, as the end 29 is firmly secured to the hub 3 and the coils of the spring 23 firmly grip the portion 27 of the disc 17. In such normal driving conditions, the wheel-hub-disc combination will decelerate relative to the pads 21, thus braking the car. Under such conditions, the flywheel 35 rotates in combination with the spring 23 and disc 17.

However, if a situation arises where a large deceleration of the wheel occurs, for example, if the wheel has lost traction relative to the road and is skidding, such large deceleration will cause a movement of the flywheel 35 relative to the disc 17 and the spring 23, due to its inertia. This will cause the end 33 of the spring 23 to move with the flywheel, thus unwinding the spring 23 relative to the portion 27 of the disc 17. This unwinding action causes the spring 23 to part contact with the portion 27 thus removing the braking effect momentarily until the deceleration has been reduced or the inertia of the flywheel 35 has been overcome sufficiently to allow the spring 23 to once more engage the portion 27, and thus recommence the braking action.

A judicious choice of spring material, length and cross-section, as well as selection of the weight of the flywheel enables the degree of deceleration necessary for this to occur. It is generally accepted that the relative deceleration of a wheel relative to a vehicle in wet or slippery conditions when the wheel is skidding, this being a considerably greater deceleration than that which is encountered during normal braking, is of the order of 1.2 G. Calculations on the basis of a one ton vehicle, having disc assemblies 1 on both front wheels, show that a spring made of materia of at least EN50 having a cross-section, at the end 29, of approximately 27 mm$^2$ (0.035 sq ins) and a flywheel 35 of approximately 1.4 kilograms (3 lbs) will give a disengaging action at decelerations above 1.2 G. The cross section of the spring 23 may taper from end 29 to end 33.

It will be appreciated that detachment of the flywheel from the spring will not hinder the braking action. Similarly breakage of the spring 23 in the region of the end 33 will not result in braking failure, as the majority of the braking force is transmitted through the coils of the spring 23 nearest to the end 29 thereof.

It will be appreciated that due to tolerances in material size and weight of the various components of the described embodiment, the assembled device may, in practice, not be responsive to the desired deceleration. However, calibration of the device may be simply effected by adjustment of the weight of the flywheel 35, during manufacture.

Where the invention is used on a motor vehicle such as a car, it may be desirable to insert a ratchet mechanism, for when a reverse gear on such a vehicle is engaged. This avoids the problem caused by the flywheel spring, or flywheel clutch mechanism, of the two described embodiments, working in reverse due to the pitch direction of the spring 23, when the vehicle moves in a reverse direction.

While the embodiment of the invention has been described with reference to an anti-skid system, particularly, but not exclusively, applicable to a motor vehicle, it should be apparent that with small modifications such a system could be applied to prevent excessive acceleration, for example to prevent squealing and spinning for driving wheels of a motor vehicle, when starting from rest. In the embodiment, the direction of winding/unwinding of the spring 23 would have to be reversed, and the spring 23 would engage a drive shaft, as opposed to the disc 17.

The invention is particularly applicable to motor cycles, to prevent disc brakes locking and also to prevent a motor cyclist doing a "wheelie" when starting from rest and dropping the clutch too quickly.

The invention is further applicable to pedal bicycles, in particular with relations to preventing skidding or dragging of tires.

What is claimed is:

1. A device for avoiding skidding or wheel spinning in a vehicle, said device comprising:
    a fixed hub to which a heel can be attached,
    force application means for applying force to the fixed hub,
    a rotatable flywheel arranged coaxially within the hub,
    a single wrap spring clutch having a first end secured directly to said hub,
    a plurality of coils resiliently engaged around the force application means below a pre-determined rate of change of velocity of the hub relative to the flywheel, the second end of said wrap spring clutch being secured directly to the flywheel so that the plurality of coils disengage the force application means at said pre-determined rate of change of velocity and so that fracture of the wrap spring clutch near the second end leaves the hub still engaged to the force application means.

2. A device as claimed in claim 1 in which the wrap spring clutch is formed of high tensile steel wire of square cross section.

3. A device as claimed in claim 1 further characterised in that the flywheel is responsive to the rate of change of angular velocity of the hub.

4. A device as claimed in claim 1 further characterised in that the force application means is a brake assembly.

* * * * *